United States Patent
Tanaka et al.

(10) Patent No.: US 9,413,522 B2
(45) Date of Patent: Aug. 9, 2016

(54) OPTICAL RECEIVER AND SIGNAL PROCESSING METHOD FOR OPTICAL RECEIVER

(71) Applicant: FUJITSU LIMITED, Kawasaki-shi, Kanagawa (JP)

(72) Inventors: Daijiro Tanaka, Fuchu (JP); Osamu Takeuchi, Kawasaki (JP); Taku Saito, Kawasaki (JP); Hirofumi Araki, Kawasaki (JP); Katsumi Fukumitsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/620,434

(22) Filed: Feb. 12, 2015

(65) Prior Publication Data

US 2015/0229401 A1 Aug. 13, 2015

(30) Foreign Application Priority Data

Feb. 13, 2014 (JP) .................. 2014-025728

(51) Int. Cl.
*H04B 10/06* (2006.01)
*H04L 7/00* (2006.01)
*H04B 10/61* (2013.01)

(52) U.S. Cl.
CPC ............ *H04L 7/0075* (2013.01); *H04B 10/614* (2013.01); *H04B 10/6162* (2013.01)

(58) Field of Classification Search
CPC ............ H04B 10/616; H04B 10/6161; H04B 10/6162; H04B 10/6163; H04B 10/6164; H04B 10/6165; H04B 10/6166; H04B 10/40; H04B 10/697; H04B 10/613

USPC ......... 398/202, 205, 206, 207, 208, 209, 210, 398/135, 136, 152, 65, 158, 159, 154, 155, 398/81, 147, 33, 25

See application file for complete search history.

(56) References Cited

U.S. PATENT DOCUMENTS

| 7,555,227 | B2* | 6/2009 | Bontu | ............... | H04B 10/2572 398/202 |
| 8,705,977 | B1* | 4/2014 | Mo | .................... | H04B 10/2569 398/152 |

(Continued)

FOREIGN PATENT DOCUMENTS

JP 2012-119923 A 6/2012

OTHER PUBLICATIONS

USPTO, [Wolf], Non-Final Office Action mailed on May 15, 2015 issued in related U.S. Appl. No. 14/082,521 (pending).

(Continued)

*Primary Examiner* — Hanh Phan
(74) *Attorney, Agent, or Firm* — Fujitsu Patent Center

(57) ABSTRACT

An optical transceiver converts a received optical signal to an electric signal and converts the electric signal to a digital signal, and has an adaptive equalizer to adaptively equalize the digital signal, a synchronization part to synchronize a first polarized wave and a second polarized wave contained in the adaptively equalized digital signal and having polarization axes perpendicular to each other, and a symbol offset determination part to determine an amount of symbol offset between the first polarized wave and the second polarized wave based upon symbol synchronization information of the first polarized wave and the second polarized wave supplied from the synchronization part, the symbol offset determination part being configured to repeat determination of the amount of symbol offset and restart the adaptive equalizer until the symbol offset is minimized.

14 Claims, 14 Drawing Sheets

(56) References Cited

U.S. PATENT DOCUMENTS

| | | |
|---|---|---|
| 2011/0229127 A1 | 9/2011 | Sakamoto et al. |
| 2012/0134684 A1 | 5/2012 | Koizumi et al. |
| 2012/0230676 A1 | 9/2012 | Mo et al. |
| 2014/0212132 A1* | 7/2014 | Saito .................. H04L 25/03 398/25 |

OTHER PUBLICATIONS

USPTO, [Wolf], Final Office Action mailed on Aug. 27, 2015 issued in related U.S. Appl. No. 14/082,521 (pending).

USPTO, [Wolf], Non-Final Office Action mailed on Dec. 21, 2015 issued in related U.S. Appl. No. 14/082,521 (pending).

EESR—The Extended European Search Report mailed on Jul. 21, 2014 issued with respect to the European Patent Application No. 13193437.4 (European Patent Application No. 13193437.4 is a corresponding patent application of the U.S. Appl. No. 14/082,521).

Faruk et al., "Multi-Impairments Monitoring from the Equalizer in a Digital Coherent Optical Receiver", 36th European Conference and Exhibition on Optical Communication, Torino, Italy, Sep. 19-23, 2010, pp. 1-3, IEEE.

Hauske et al., "Optical Performance Monitoring in Digital Coherent Receivers", Journal of Lightwave Technology, vol. 27, No. 16, pp. 3623-3631, Aug. 15, 2009, IEEE.

\* cited by examiner

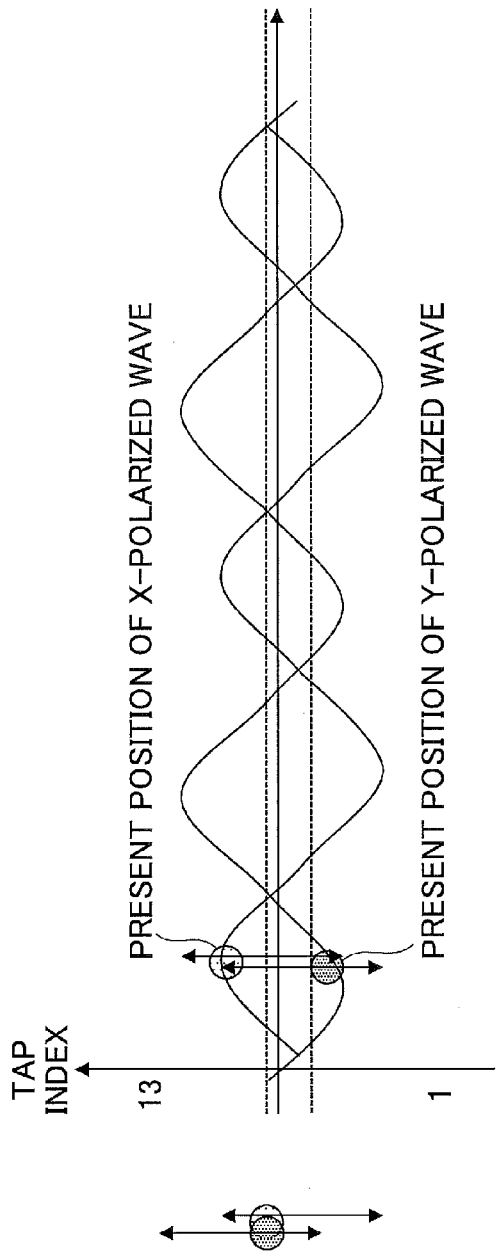
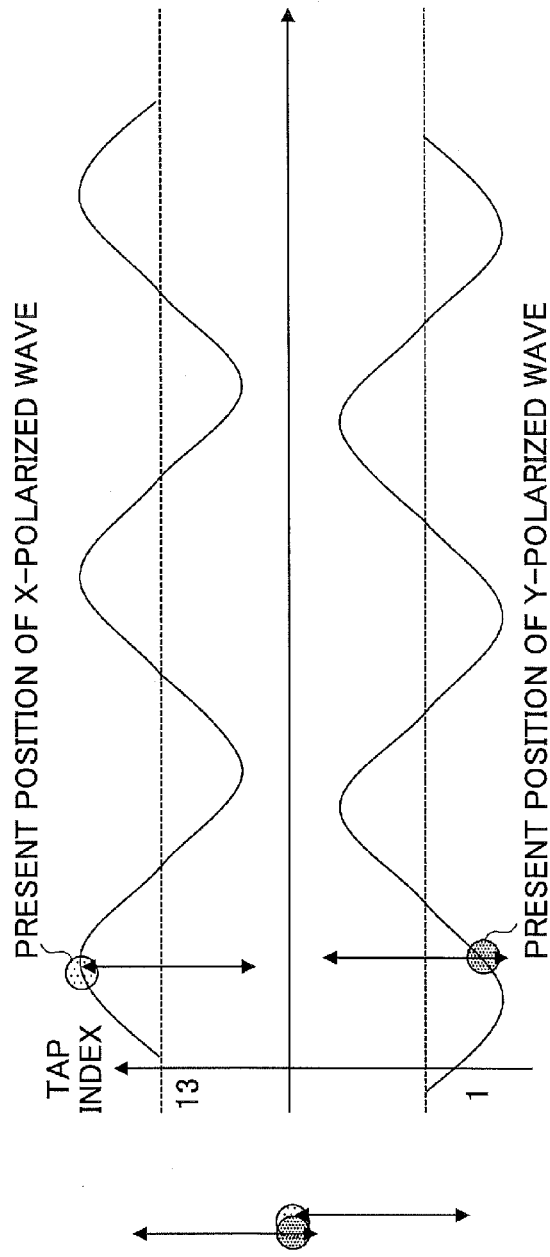
FIG.1A
FIG.1B

FIG.6
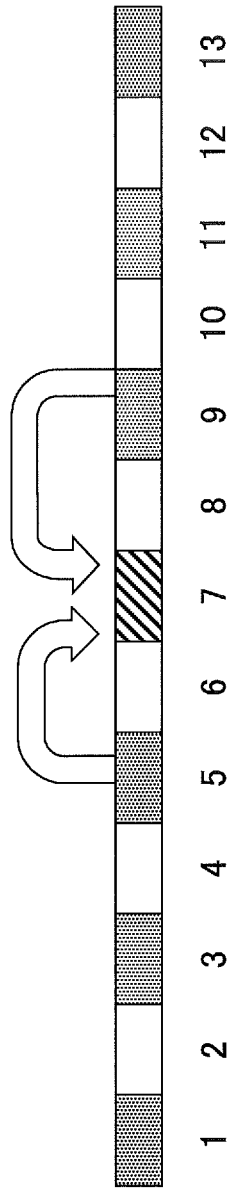
(A) SYMBOL FIX POINT AT ODD TAP POSITION
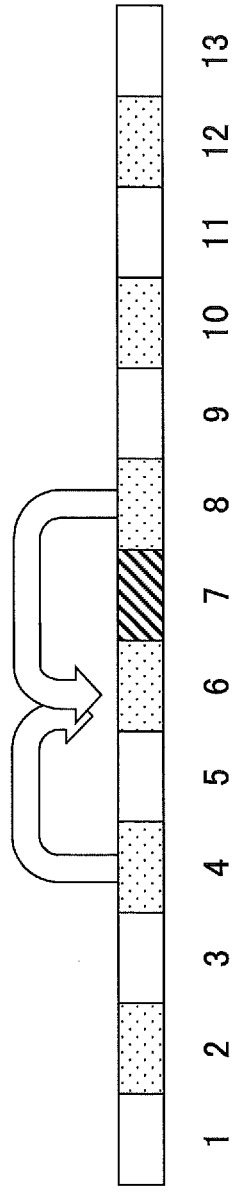
(B) SYMBOL FIX POINT AT EVEN TAP POSITION

FIG.7

PROBABILITY OF OPTIMUM CONVERGENCE
(SYMBOL OFFSET IS ZERO)

| | | 0° | 30° | 60° | 90° |
|---|---|---|---|---|---|
| INITIAL REFERENCE POSITION FOR TAP COEFFICIENTS | 6 | LARGE | MIDDLE | VERY SMALL | SMALL |
| | 7 | VERY SMALL | LARGE | VERY SMALL | LARGE |
| | 8 | VERY SMALL | SMALL | LARGE | MIDDLE |

ANGLE OF POLARIZATION AT START-UP

LARGE: HIGH PROBABILITY OF ACQUIRING OPTIMUM CONVERGENCE AT RESTART-UP
VERY SMALL: LOW PROBABILITY OF ACQUIRING OPTIMUM CONVERGENCE AT RESTART-UP

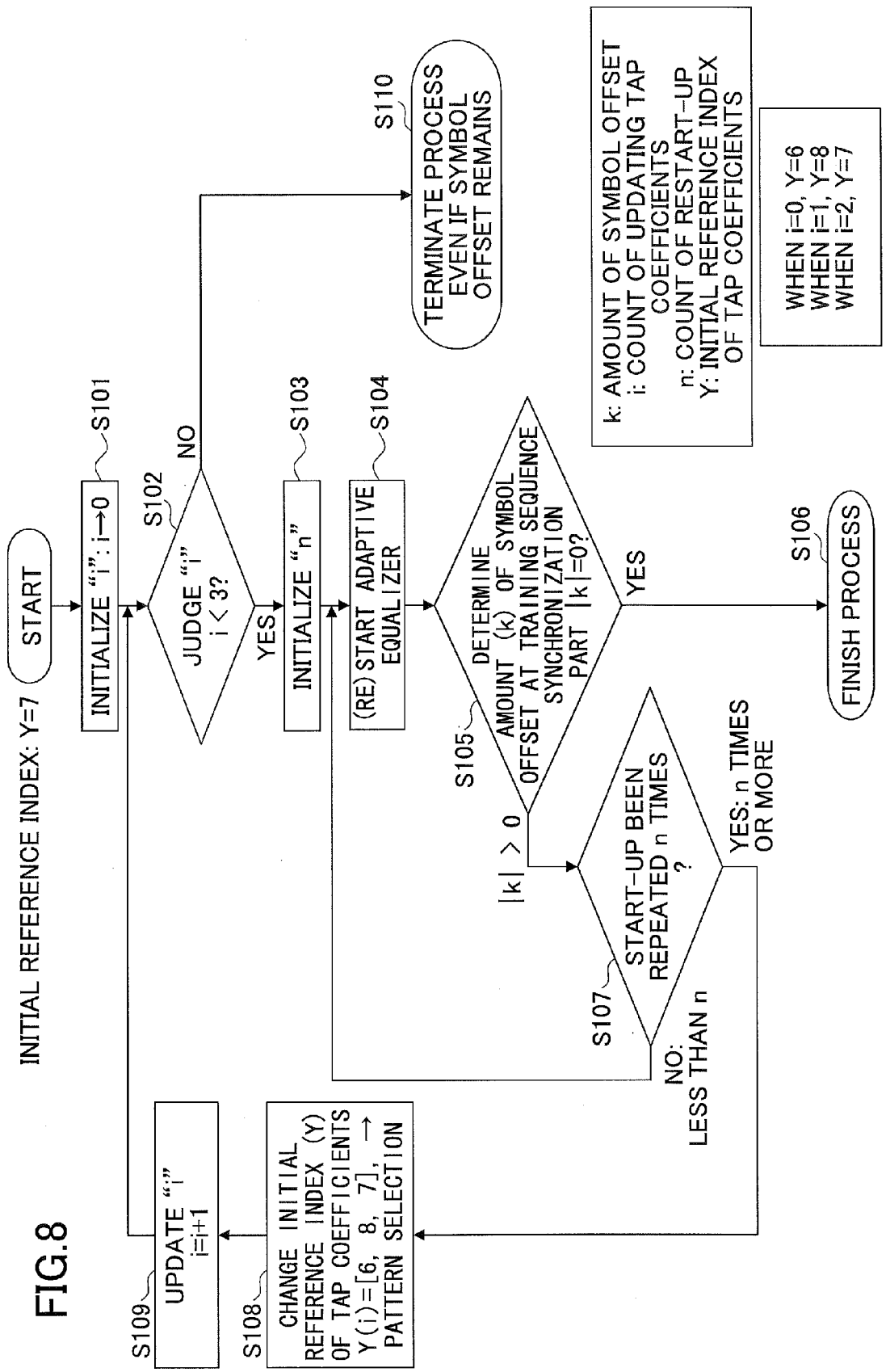

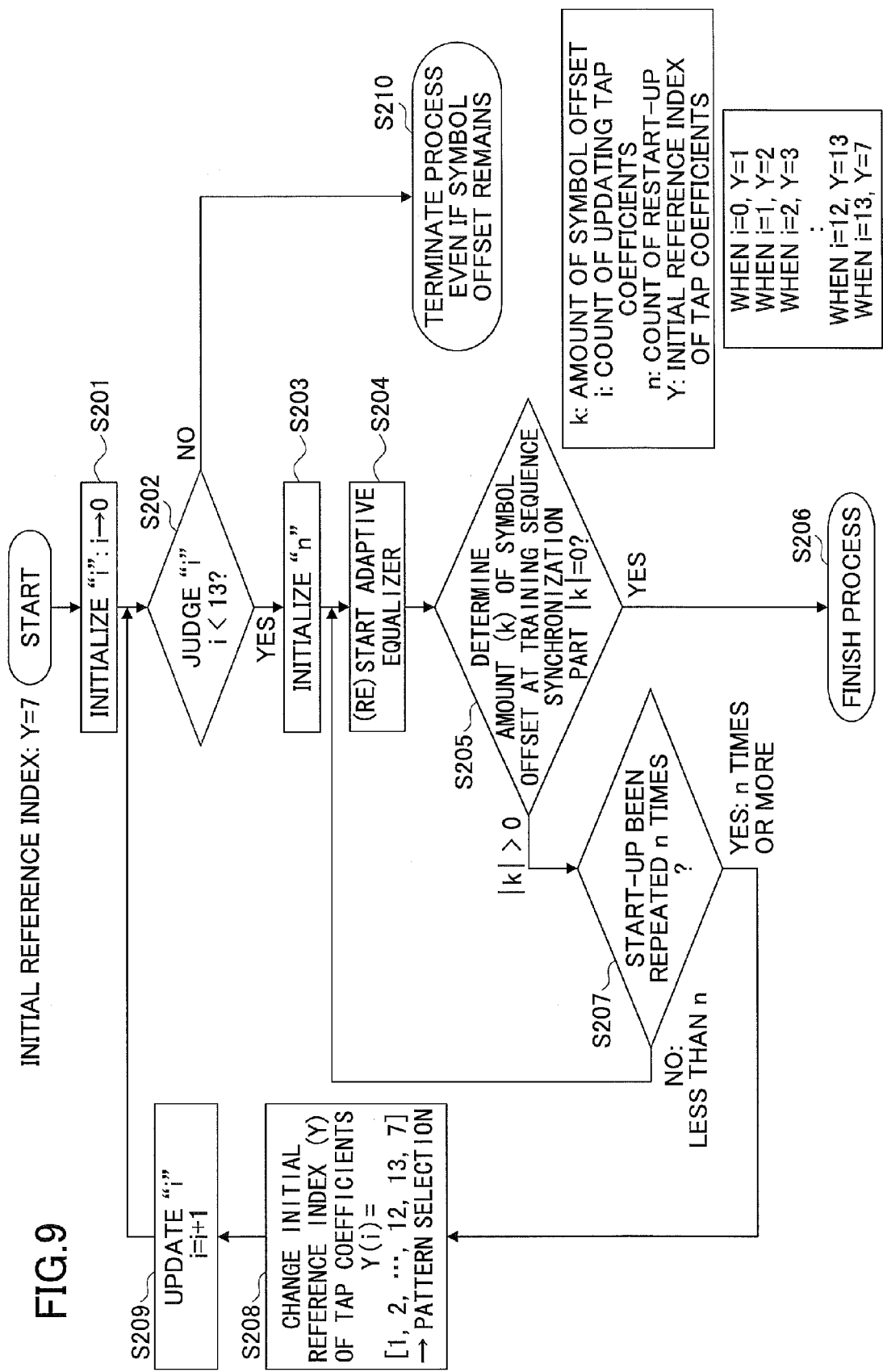

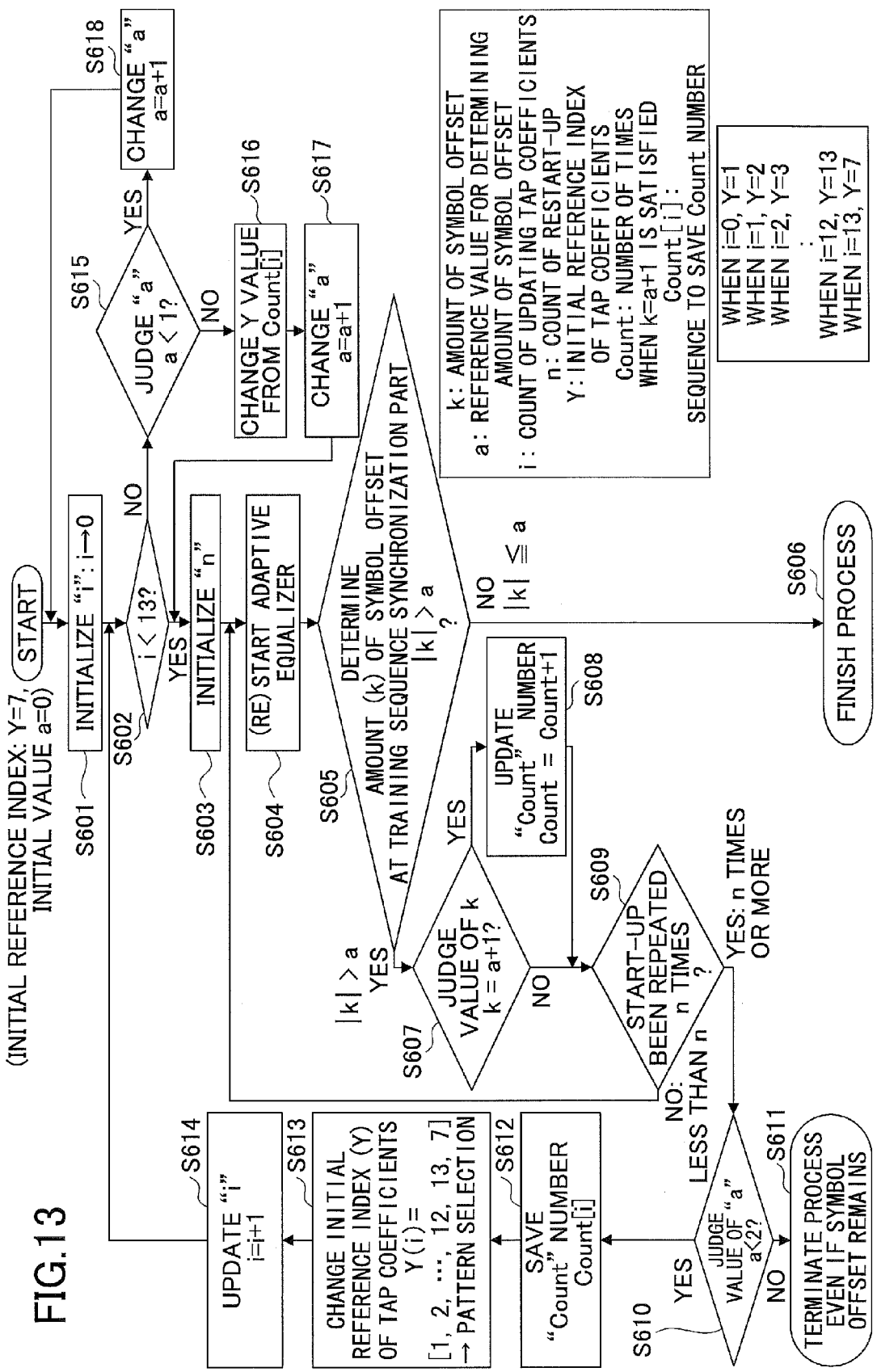

US 9,413,522 B2

OPTICAL RECEIVER AND SIGNAL PROCESSING METHOD FOR OPTICAL RECEIVER

CROSS-REFERENCE TO RELATED APPLICATIONS

This application is based upon and claims the benefit of priority of the prior Japanese Patent Application No. 2014-025728 filed on Feb. 13, 2014, which is incorporated herein by reference in its entirety.

FIELD

The disclosures herein generally relate to an optical transceiver and a signal processing method for the optical transceiver.

BACKGROUND

Digital coherent receivers generally use an adaptive equalizer to compensate for differential group delay (DGD) on the transmission paths. In a 40 Gbps or 100 Gbps system, the rotating state of polarization changes due to a change in the external conditions such as vibration or temperature of the transmission path.

The converging state of an adaptive equalizer varies depending on the polarization state at the time of initial pull-in (or startup), and the adaptive equalizer may have an undesirable converging state that causes degradation of signal quality. Depending on the state of convergence at the startup, the DGD tolerance of the adaptive equalizer may fall and the resultant signal quality (such as bit error rate: BER) may deteriorate.

An adaptive equalizer by itself cannot determine if it resides in the undesirable converging state causing degradation of signal quality. In general, suitability of the converging state cannot be determined unless the BER is monitored, and it takes time for the entire system to start up.

One approach for improving the DGD tolerance of an adaptive equalizer is to increase the number of taps of the finite impulse response (FIR) filter. However, in reality, it is impossible to increase the number of taps without limitation because of the limited circuit scale. It is desirable to correct the undesirable converging state (or positional deviation of tap coefficients) and provide stable performance of equalization without increasing the number of taps.

A method of bringing the weighting center of the tap coefficients toward the tap center of an adaptive equalizer is known. See, for example, Japanese laid-open Patent Publication No. 2012-119923. This method is used to reduce the remainder of equalization.

SUMMARY

A technique of optimizing the converging state of an adaptive equalizer is provided.

In one aspect of the disclosure, an optical transceiver includes a receiving frontend to receive an optical signal and output an electric signal;

a converter to convert the electric signal to a digital signal;

an adaptive equalizer to adaptively equalize the digital signal;

a synchronization part to synchronize a first polarized wave and a second polarized wave contained in the adaptively equalized digital signal with each other, polarization axes of the first polarized wave and the second polarized wave being perpendicular to each other; and a symbol offset determination part to determine an amount of symbol offset between the first polarized wave and the second polarized wave based upon symbol synchronization information of the first polarized wave and the second polarized wave supplied from the synchronization part, the symbol offset determination part being configured to repeat determination of the amount of the symbol offset and output a restart-up instruction to the adaptive equalizer until the symbol offset is minimized.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 1A illustrates fluctuation of temporal positions of an X-polarized wave component and a Y-polarized wave component due to DGD;

FIG. 1B illustrates fluctuation of temporal positions of an X-polarized wave component and a Y-polarized wave component due to DGD;

FIG. 6 illustrates possible states in the adaptive equalizer under double oversampling;

FIG. 7 illustrates likelihood of desirable convergence depending on an initial reference index for tap coefficients and polarization angle;

FIG. 8 is a flowchart of optimization of an adaptive equalizer through restart-up operations according to the first embodiment;

FIG. 9 is a modification of the operation flow of FIG. 8;

FIG. 13 is a modification of the operation flow of FIG. 12;

DESCRIPTION OF DISCLOSURE

Figure 2:
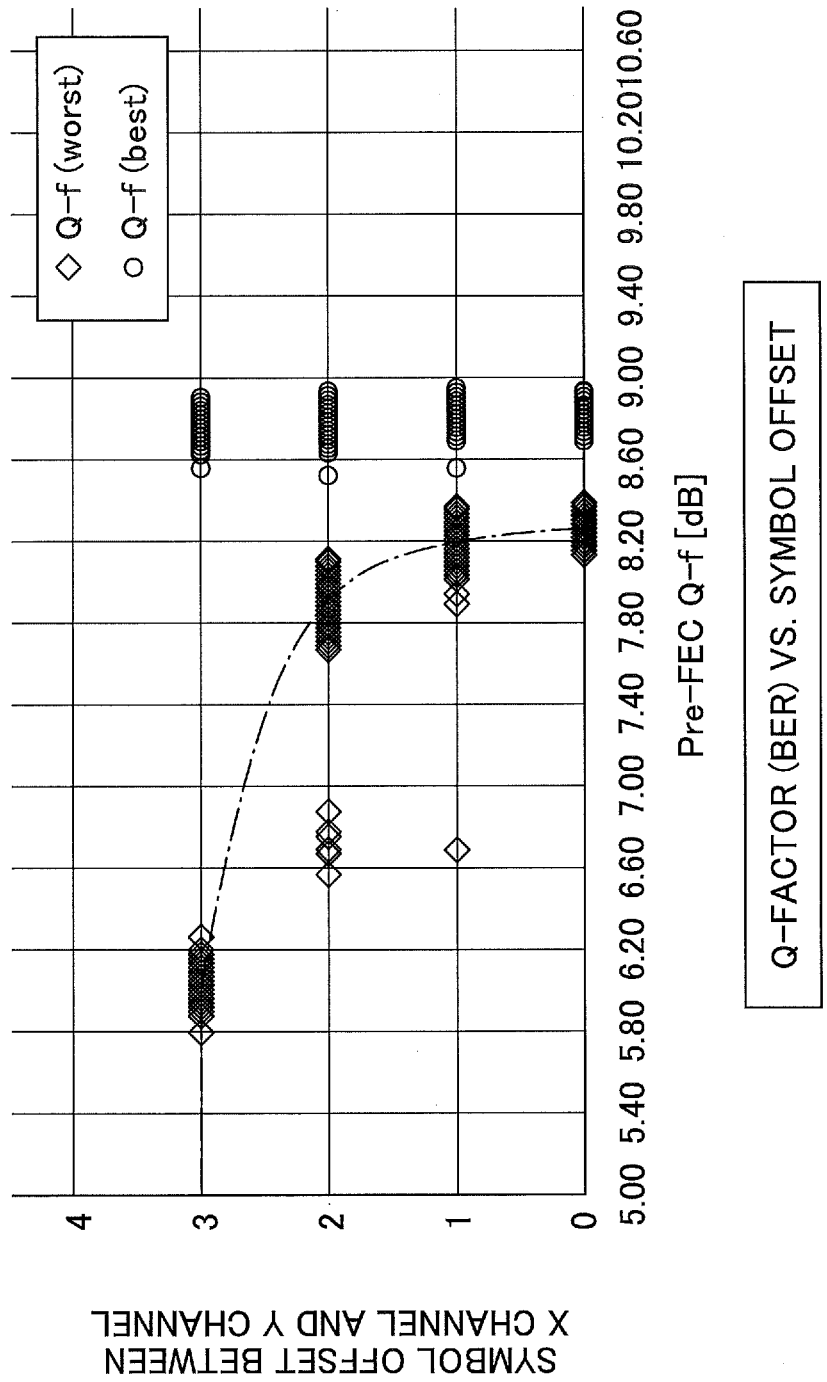
FIG. 2 is a chart illustrating a relationship between Q-factor (or BER) and symbol offset between an X-polarized wave and a Y-polarized wave.

The inventors found that there is a correlation between the converging state of an adaptive equalizer and the amount of symbol offset in a synchronization process using a training sequence. Symbol offset between X-polarized wave and Y-polarized wave affects the Q-factor (or the BER) of an optical transceiver. If so, signal degradation due to fluctuation of the polarization angle may be prevented by changing an initial reference index (or initial reference position) for the tap coefficients of the adaptive equalizer in the direction to eliminate the symbol offset. This basic idea will be explained below.

In an adaptive equalizer, an initial reference index is provided as a starting point to start calculation of tap coefficients. In general, the tap center (for example, tap 7 of a thirteen-tap sequence) is selected as the initial reference index so as to converge the state of the tap coefficients to or near the tap center. A weighting factor "1" is set in the tap of the initial reference index, and weighting factors "0" are set in the rest of the taps. If the DGD increases, the weighting center of the X-polarized wave and the weighting center of the Y-polarized wave deviate from the initial reference index (e.g., tap 7 with weighting factor "1") in the adaptive equalizer. When the weighting centers of the polarized waves deviate from the tap center, the DGD absorbing range is narrowed.

FIG. 1A and FIG. 1B illustrate fluctuations in temporal positions of the X-polarized wave and the Y-polarized wave caused by DGD. Due to the influence of the DGD on the transmission path, a delay is produced between the X-polarized wave and the Y-polarized wave, and an adaptive equalizer is supposed to compensate for the delay. The X-polarized wave and the Y-polarized wave change along the time axis (the horizontal arrow in the figures) according to the rotation of the polarization angle. The weighting center of the X-polarized wave and the weighting center of the Y-polarized wave change somewhat symmetrically. The magnitude of the DGD appears as the amplitude in FIG. 1A and FIG. 1B. The adaptive equalizer is configured to bring the present temporal positions of the X-polarized wave and the Y-polarized position to the tap center (e.g., tap 7 of thirteen-tap sequence). However, if the center of the change of the X-polarized wave and the center of the change of the Y-polarized wave (indicated by the dashed lines in the figures) are separated from each other, a symbol offset is observed between the X-polarized wave and the Y-polarized wave during the synchronization of the training sequence. The amount of symbol offset varies as illustrated in FIG. 1A and FIG. 1B. Let's assume that the adaptive filter pulls in a 1-symbol bit sequence every two taps. If there is a separation of several taps between the center of change of the X-polarized wave and the center of change of the Y-polarized wave as illustrated in FIG. 1A, then symbol offset of one symbol or two symbols is observed during the synchronization of the training sequence.

In FIG. 1B, the quantity of delay between the X-polarized wave and the Y-polarized wave pulled in the FIR filter is greater than that in FIG. 1A. In this case, symbol offset of several symbols or more is observed during the synchronization of the training sequence.

FIG. 2 is a chart illustrating the relationship between the Q-factor (BER) and the amount of symbol offset. The simulation is carried out under the conditions that the DGD is 90 ps and the second-order polarization mode dispersion is 0 ps2. Other load conditions such as laser frequency offset or receiver band are also added. Focusing only on the best values (indicated by circles) of the Q-factor, it may appear that there is little influence of symbol offset on the Q-factor. However, paying attention to the worst values (indicated by diamonds) of the Q-factor, the DGD tolerance abruptly decreases and the BER deteriorates when the symbol offset is greater than 2 symbols.

From the foregoing observations, we propose to monitor the amount of symbol offset between the X-polarized wave and the Y-polarized wave at the training sequence synchronization part of an optical transceiver. The initial pull-in operation of an adaptive equalizer is repeated until the symbol offset becomes zero or the minimum, namely, until the converging state of the adaptive equalizer is optimized as much as possible. Because the polarization angle on the transmission path ordinarily changes, the converging state of the adaptive equalizer changes every time it is started. When the adaptive equalizer is restarted at a specific polarization angle that brings the converging state to the optimum state, the symbol offset becomes zero or the minimum.

Our proposed method is capable of determining the suitability of the converging state of the adaptive equalizer using symbol offset information acquired from synchronization of a training sequence. The adaptive equalizer is stabilized at an earlier stage without monitoring the BER and without increasing the number of taps. The system can be started up with the improved DGD tolerance.

Figure 3:
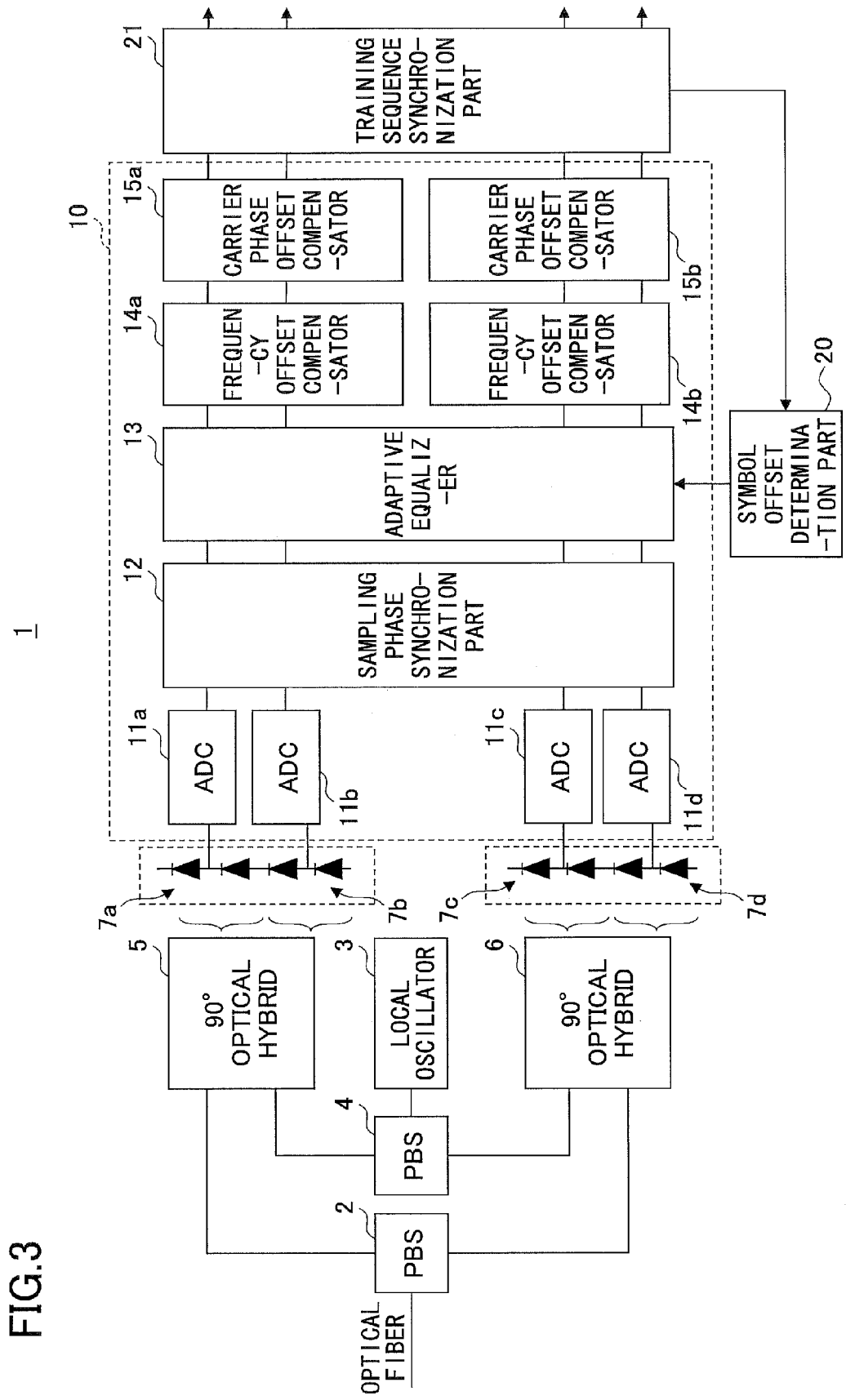
FIG. 3 is a schematic diagram of an optical transceiver according to the embodiments.

FIG. 3 illustrates an example of an optical transceiver 1 according to the embodiment. The optical transceiver 1 includes an optical digital coherent receiver. In the optical transceiver 1, compensation for waveform distortion and adaptive equalization are carried out by a digital signal processor 10. For convenience sake, analog to digital converters (ADCs) 11a-11d are depicted in the digital signal processor 10; however, the ADCs 11a-11d may be arranged in a separate circuit.

The optical signal received at the optical transceiver 1 is split by a polarization beam splitter 2 into two polarization components whose polarization planes are perpendicular to each other. The polarization components are guided to 90-degree optical hybrid mixers 5 and 6, respectively. The light beam emitted from a local oscillator 3 is split by a polarization beam splitter 4 and the respective light components are guided to the 90-degree optical hybrid mixers 5 and 6. The polarization components of the received signal are intercepted at the 90-degree optical hybrid mixers 5 and 6 by the corresponding light components of the locally oscillated beam. The in-phase (I) component and the quadrature (Q) component of the interference light output from the 90-degree optical hybrid mixer 5 are detected by the photo-detectors 7a and 7b. Similarly, the I component and the Q component of the interference light output from the 90-degree optical hybrid mixer 6 are detected by the photo-detectors 7c and 7d. Although in FIG. 3 the receiver frontend uses polarization beam splitters 2 and 4, a local oscillator 3, 90-degree optical hybrid mixers 5 and 6, and photo-detectors 7a-7d, the invention is not limited to this example.

The signals detected by the photo-detectors 7a-7d and converted into electric voltage signals by transimpedance amplifiers (not illustrated) are digitalized by the ADCs 11a-11d. The ADCs 11a-11d perform digital sampling at, for example, a double oversampling rate.

A sampling phase-synchronization part 12 synchronizes the digitally sampled signals supplied from the ADCs 11a-11d. An adaptive equalizer 13 is, for example, a known butterfly-type adaptive filter that extracts four sequences with different polarizations HH, HV, VH, and VV from the received signal. The adaptive equalizer 13 separates the X-polarized component and the Y-polarized component of the transmitted light and adaptively equalizes waveform distortion. Frequency offset compensators 14a and 14b remove frequency offset between the frequency of a sender-side signal light source and the frequency of the local oscillator 3. Carrier phase offset compensators 15a and 15b compensate for phase offset between the sender-side signal light source and the local oscillator 3. A training sequence synchronization part 21 detects training sequences of the respective channels XI, XQ, YI, and YQ output from the adaptive equalizer 13 and synchronizes the four channels.

The optical transceiver 1 has a symbol offset determination part 20. A training sequence synchronization part 21 feeds a synchronized time of the X-polarized wave and a synchronized time of the Y-polarized wave back to the symbol offset determination part 20. If the synchronized time of the X-polarized wave is different from that of the Y-polarized wave, the time difference is observed as a symbol difference between the X-polarized wave and the Y-polarized wave. Depending on which polarized wave comes into synchronization first, the sign (plus or minus) of the symbol offset changes. However, in the embodiment, the convergence state is determined based upon the magnitude (or the absolute value) of the symbol offset, and therefore, the sign does not have very much effect.

The symbol offset determination part 20 determines an amount of symbol offset between the X-polarized wave and the Y-polarized wave based upon the information supplied from the training sequence synchronization part 21, and it performs optimization of the adaptive equalizer 13 based upon the determined symbol offset.

Figure 4:
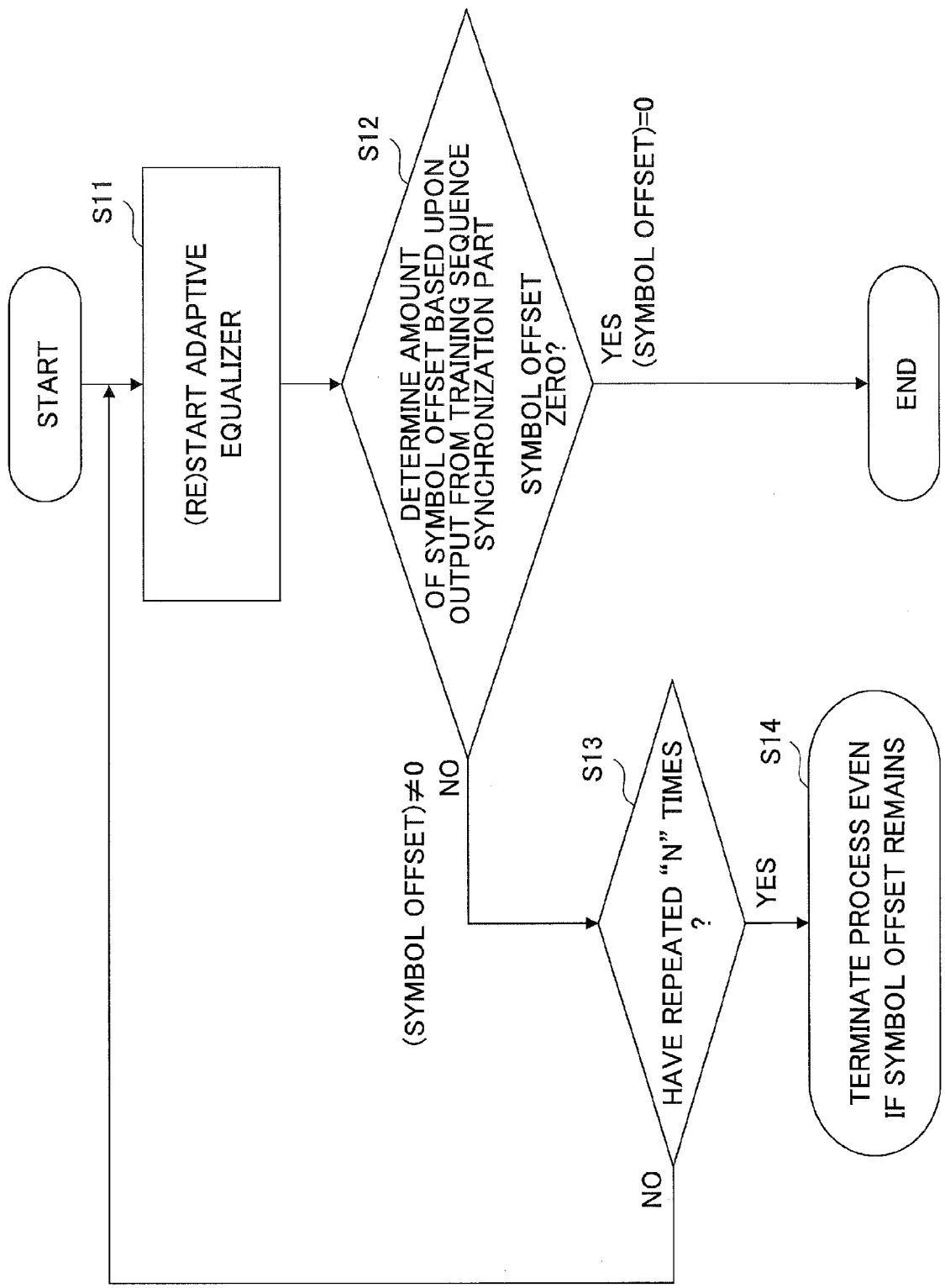
FIG. 4 is a flowchart illustrating basic operations of correction for symbol offset by carrying out restart-up of an adaptive equalizer.

FIG. 4 is a flowchart illustrating basic operations of the symbol offset determination part 20. The symbol offset determination part 20 outputs a startup instruction (i.e., a reset signal) to the adaptive equalizer 13 (S11). Upon receiving the startup instruction, the adaptive equalizer 13 starts pulling in signals to carry out adaptive equalization. The result of the adaptive equalization is supplied via the frequency offset compensators 14a and 14b, and via the carrier-wave phase offset compensators 15a and 15, to the training sequence synchronization part 21 (see FIG. 3).

The symbol offset determination part 20 determines a symbol offset between the X-polarized wave and the Y-polarized wave based upon a feedback signal from the training sequence synchronization part 21 (S12). If the symbol offset amount is zero, it is determined that for the current pulling-in, the positions of the tap coefficients are converged to the optimum state and the optimization process is terminated.

If the symbol offset is not zero, the number of times determination is made on symbol offset is incremented (S13) and a startup instruction is output to the adaptive equalizer 13 (S11). In response to the instruction, the adaptive equalizer 13 starts pulling in signals again to carry out adaptive equalization. The symbol offset determination part 20 determines an amount of symbol offset based on a new feedback signal from the training sequence synchronization part 21 (S12). These steps are repeated until the symbol offset becomes zero. If the symbol offset does not become zero after the startup instruction has been repeated a predetermined number of time (e.g., N times), the process is terminated even if a symbol offset still remains (S14). In this case, the optical transceiver 1 is operated in the latest state in which the adaptive equalizer 13 was started up the last time.

There are two modifications (applications) of the operation flow of FIG. 4. The first one is the case in which the amount of symbol offset is small (for example, offset of ±1 symbol). In this case, the Q-factor is likely to be in a satisfactory range as illustrated in FIG. 2. Accordingly, if the symbol offset has become at or below a predetermined value after several times of repetition of the flow, then the optimization process is terminated at that point of time to start operating the optical transceiver. The second one is the case in which the amount of symbol offset does not become small even after the flow is repeated N times. In this case, the states of the H-polarized wave and the V-polarized wave may not change easily on the transmission path, while keeping a positional offset in time domain. Accordingly, the initial reference index of the tap coefficients of the adaptive equalizer is changed to retry the optimization process, as will be explained below.

Figure 5:
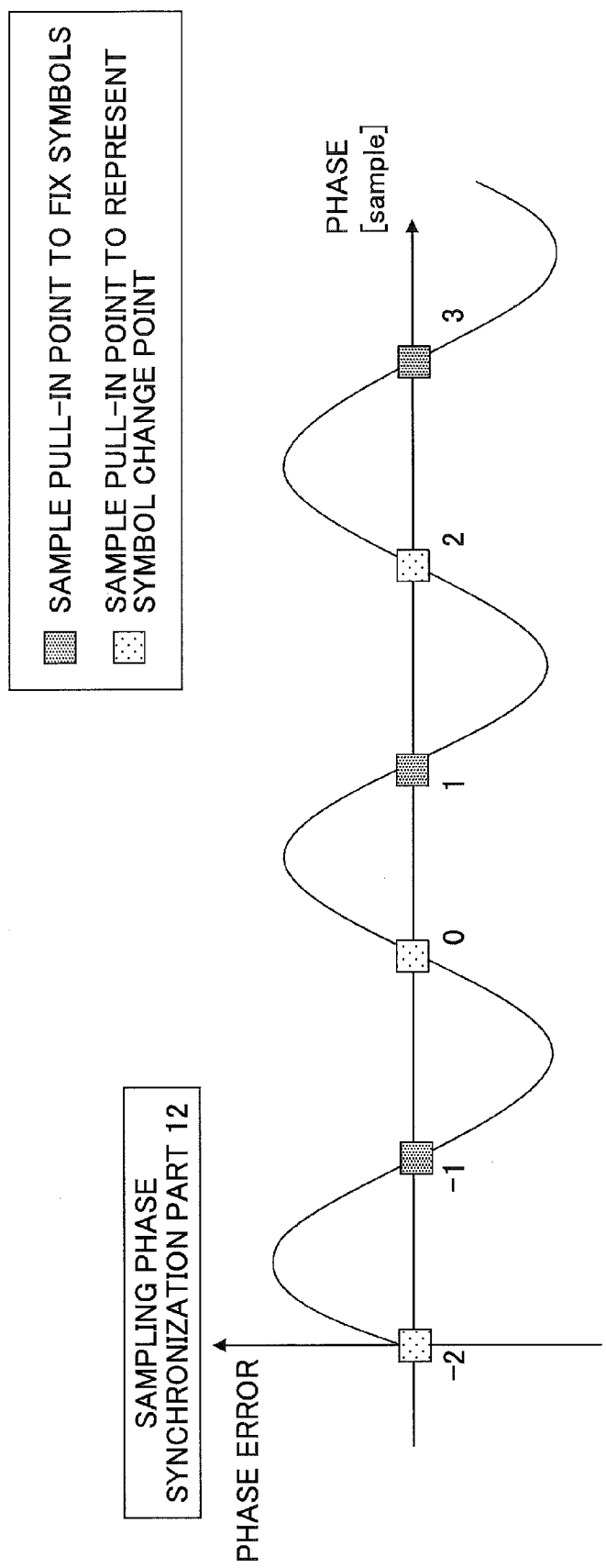
FIG. 5 illustrates the state of pull-in points in a sampling phase-synchronization part.

Next, explanation is made of the sampling phase-synchronization part 12. FIG. 5 illustrates sample pull-in points available in the sampling phase-synchronization part 12. The sampling phase-synchronization part 12 pulls in signals at a sampling frequency such that a phase error is minimized or reduced to zero. If double oversampling is performed at the A/D converters, a sample pull-in point to fix symbols and a sample pull-in point to represent a symbol change point alternately come out. The state of the adaptive equalizer 13 varies depending on which state the sample pull-in point of the sampling phase-synchronization part 12 indicates at the time of startup of the adaptive equalizer 13.

FIG. 6 illustrates two different states taken by the adaptive equalizer 13 when double oversampling is carried out. The total number of taps of this example is thirteen and the tap center is tap 7. In part (A) of FIG. 6, the symbol fix point comes to an odd tap, and in part (B) the symbol fix point comes to an even tap. Under double oversampling, the weighting center of the tap coefficients of the adaptive equalizer 13 can be shifted every two taps to correct declination of tap positions. Even if all the tap coefficients of the H-polarized side (or the V-polarized side) are shifted at once in a multiple of two taps, namely, on the symbol-by-symbol basis, only the absolute time changes and the state of convergence does not change.

In part (A) of FIG. 6, the current temporal position of the X-polarized wave (or the Y-polarized wave) is at tap 5 or tap 9. The tap coefficients are shifted all at once by two taps (that is, one symbol) to achieve appropriate convergence to the initial reference tap index 7. This arrangement can easily minimize symbol offset between the X channel and the Y channel.

In part (B) of FIG. 6, the current temporal position of the X-polarized wave (or the Y-polarized wave) is at tap 4 or tap 8. In this case, the converging position deviates slightly from the initial reference tap index 7 even after the weighting center of the tap coefficients is shifted by two taps toward the tap center. Symbol offset still remains between the X channel and the Y channel and it is difficult to completely eliminate the remaining symbol offset.

Accordingly, in the basic flow of FIG. 4, if the symbol offset remains after N-time repetition of the process (YES in S13), the initial reference tap index of the adaptive equalizer may be changed from 7 to 6 or 8. By changing the initial reference tap index and the tap coefficient values, the probability of minimization of symbol offset is increased and the adaptive equalizer 13 can achieve the optimum convergence.

The probability of achieving the optimum convergence depends on not only the initial reference tap index, but also the polarization angle at startup time of the adaptive equalizer 13.

FIG. 7 illustrates a relationship between initial reference tap index and polarization angle at startup of the adaptive equalizer 13. Each block of the table indicates how large the probability of achieving the optimum convergence (without symbol offset) is. "Large" means that the optimum convergence is likely to be achieved at high probability, and "very small" means that there is little probability of achieving the optimum convergence.

Let's assume that the total number of taps of the adaptive equalizer 13 is thirteen and that the initial reference tap index is set to 7. When the polarization angle is 30 degrees or 90 degrees at the startup of the adaptive equalizer 13, the optimum convergence is likely to be achieved at high probability and there is no need to change the initial reference tap index for the tap coefficients.

When the polarization angle is 0 degrees or 60 degrees at the startup of the adaptive equalizer 13, there is little likelihood of eliminating symbol offset to achieve the optimum convergence with the initial reference tap index 7. However, for the polarization angle of 0 degrees, the probability of achieving the optimum convergence (without symbol offset) can be raised by changing the initial reference tap index from 7 to 6. Similarly, for the polarization angle of 60 degrees, the probability of achieving the optimum convergence (without symbol offset) can be raise by changing the initial reference tap index from 7 to 8.

For this reason, if the symbol offset is not removed even after restart-up is repeated a predetermined number of times, then the initial reference tap index is changed and the adaptive equalizer 13 is started up again with the new initial reference tap index.

FIG. 8 illustrates operations of the symbol offset determination part 20, including changing of the initial reference tap index for the tap coefficients. In FIG. 8, the range of changing the initial reference tap index is limited to the vicinity of the tap center. For example, in the thirteen-tap adaptive equalizer 13, the initial reference tap index is changed within the range of 6, 7 and 8.

The initial reference index Y for the tap coefficients is set to an arbitrary number, for example, 7. The number of times to change the initial reference index Y for the tap coefficients is denoted by "i", where "i" is a natural number. On the condition that the initial reference index Y is changed among 6, 7 and 8, "i" is limited to less than 3 (i<3). Y(i) denotes the initial reference index for the tap coefficients at i-th change, k denotes the amount of symbol offset, and n denotes the number of times of restart-up.

First, "i" is initialized (S101), and then it is determined whether "i" is in a predetermined range (S102). Since in this example the initial reference index Y is changed within the range of 6, 7 and 8, it is determined whether "i<3" is satisfied. If "i" is within the predetermined range (i<3), n (the number of times of restart-up) is initialized (S103) and a startup instruction is output to the adaptive equalizer 13 (S104).

Then, the amount "k" of symbol offset is determined based upon the signal from the training sequence synchronization part 21 (S105). If amount of symbol offset is zero, the process terminates (S106).

If the symbol offset is not zero, it is determined whether the startup instruction has been repeated n times (S107). The startup instruction for the adaptive equalizer 13 (S104) and the determination of symbol offset (S105) are repeated until up to n times. If the symbol offset becomes zero before n repetitions, the process immediately terminates at that point of time (S106).

In the case where the symbol offset does not become zero even after n repetitions of startup instructions (YES in S107), the symbol offset determination part 20 instructs the adaptive equalizer 13 to change the initial reference index Y for the tap coefficients (S108). The number of changes of "i" is incremented by one (S109) and the process returns to S102.

If symbol offset is not eliminated even after the initial reference index Y for the tap coefficients has been changed among 6, 7 and 8, (NO in S102), the symbol offset determination part 20 terminates the process with the symbol offset left (S110). As long as the amount of symbol offset is 1 symbol or 2 symbols, the adaptive equalizer 13 operates appropriately; nevertheless the performance may be degraded to some extent.

FIG. 9 illustrates a modification of the process of FIG. 8. In FIG. 9, no limitation is set for the range of changing the initial reference index Y for the tap coefficients of the adaptive equalizer 13. Determination is made in turn, for example, from tap index 1 to tap index 13 and the process is terminated when the symbol offset becomes zero.

To avoid redundancy, only the different points from FIG. 8 are explained. After initialization of changing number "i" to zero (S201), it is determined whether "i<13" is satisfied (S202). If symbol offset becomes zero within n times of startup (or restart-up) operations at the preset initial reference index (Y=7 for example), then the process terminates (S206). If symbol offset does not become zero even after n startup instructions to the adaptive equalizer 13 (NO in S207), the initial reference index Y for the tap coefficients is changed in turn (Y=1, . . . , 12, 13) (S208), and "i" is incremented (S109). These steps are repeated within the range of i<13. When symbol offset becomes zero (YES in S205), the process terminates (S206).

In FIG. 8 and FIG. 9, within what range the initial reference index for the tap coefficients is changed (S101, S201) and from what index value the process be started, can be selected appropriately depending on the total number of taps, the oversampling rate, and other factors.

Figure 10:
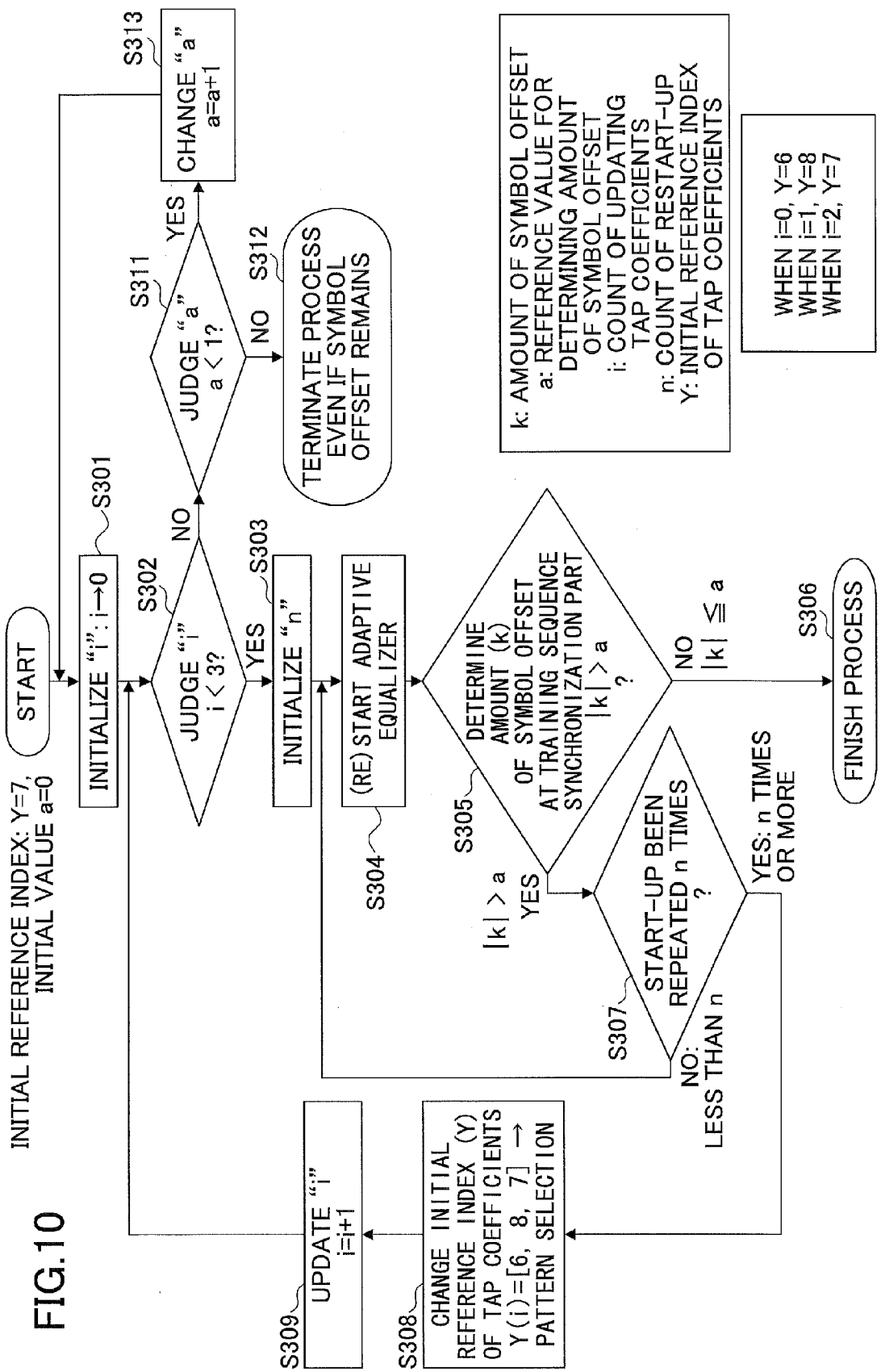
FIG. 10 is a flowchart of optimization of an adaptive equalizer through restart-up operations according to the second embodiment.

FIG. 10 illustrates another example of optimization of the adaptive equalizer 13. In FIG. 8 and FIG. 9, the process is repeated until symbol offset becomes zero within a prescribed range. In FIG. 10, a certain degree of symbol offset is accepted because the signal quality is not affected very much if the symbol offset stays within an acceptable range.

In FIG. 10, the initial reference index Y for the tap coefficients is set to the tap center (Y=7) and the Y value is changed within a limited range (for example, Y=6, 7 and 8) as in FIG. 8. A reference value "a" for determination of symbol offset is initialized to zero and symbol offset is accepted up to a=1.

First, "i" which represents how many times Y has been changed is initialized (S301), and it is determined whether "i" resides in a prescribed range (S302). In this example, it is determined whether "i" is less than 3 (i<3). If i<3 is satisfied, "n" representing the number of restart-up times is initialized (S303) and a startup instruction is output to the adaptive equalizer 13 (S304).

Upon the startup, the amount "k" of symbol offset is determined based upon the signal from the training sequence synchronization part 21 (S305). If the symbol offset is at or below the reference value "a" (|k|≤a), it is judged that the convergence state of the adaptive equalizer 13 is satisfactory and the process terminates (S306).

If the symbol offset is greater than the reference value "a" (|k|>a), it is determined whether the startup instruction has been repeated n times (S307). Startup instruction (S304) and determination of symbol offset (S305) are repeated up to n times.

In the case where the symbol offset does not reach at or below the reference value "a" even after n repetitions of startup instructions (YES in S307), the initial reference index Y for the tap coefficients is changed (S308) and "i" is incremented (S309). Then the process returns to S302.

If symbol offset is not reduced to the reference value "a" or less in spite of the switching of the Y value for the tap coefficients among 6, 7 and 8, (NO in S302), the reference value "a" is adjusted (S311). If the current "a" value is less than 1 (a<1), the "a" value is increased to broaden the acceptable range of the symbol offset (S313). In this example, "a" is increased from zero to 1. After the change of the "a" value, the process returns to S301 and the same process is repeated. If the current "a" value is at or above 1 (NO in S311), the process terminates even if symbol offset remains (S312).

The process of FIG. 10 optimizes the converging state of the tap coefficients of the adaptive equalizer 13 as much as possible by minimizing symbol offset, while adjusting the symbol offset acceptable range.

Figure 11:
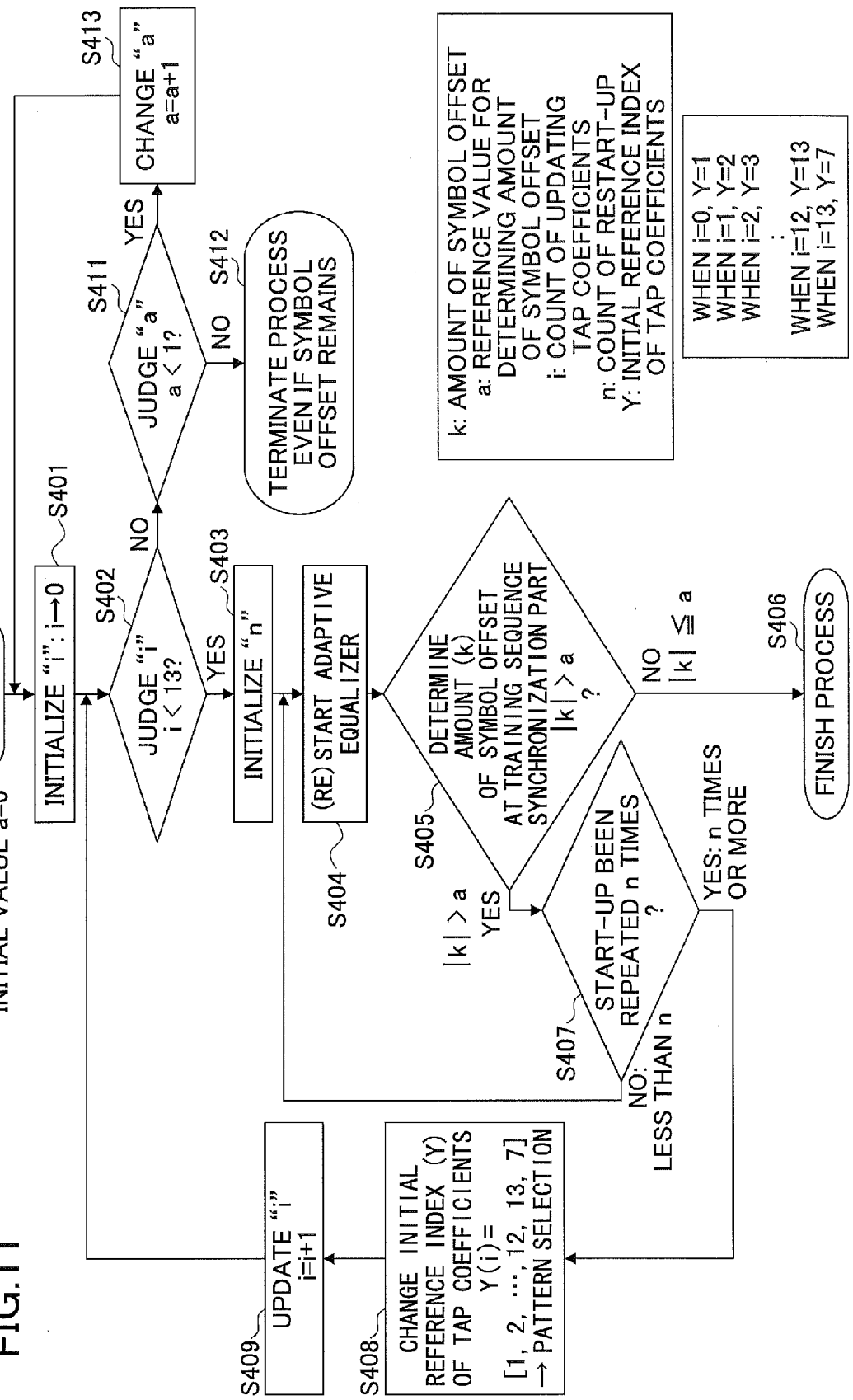
FIG. 11 is a modification of the operation flow of FIG. 10.

FIG. 11 illustrates a modification of the process of FIG. 10. In FIG. 11, the changing range of the initial reference index Y for the tap coefficients is not limited to the vicinity of the tap center, similarly to the process of FIG. 9. Determination is made for all the taps (from tap indexes 1 to 13), and the process is terminated when the symbol offset becomes less than the reference value "a" used for symbol offset determination.

To avoid redundancy, only the different points from FIG. 10 are explained. If symbol offset does not become less than the reference value "a" in spite of the optimization process with all the taps 1 through 13 having been swept (NO in S402), the reference value "a" is adjusted. If the "a" value is less than 1 (YES in S411), "a" is increased to 1 so as to broaden the acceptable range of the symbol offset (S413). Then, the process returns to S401 to repeat the same process until the symbol offset becomes at or below the adjusted reference value "a". This arrangement can also minimize the symbol offset.

Figure 12:
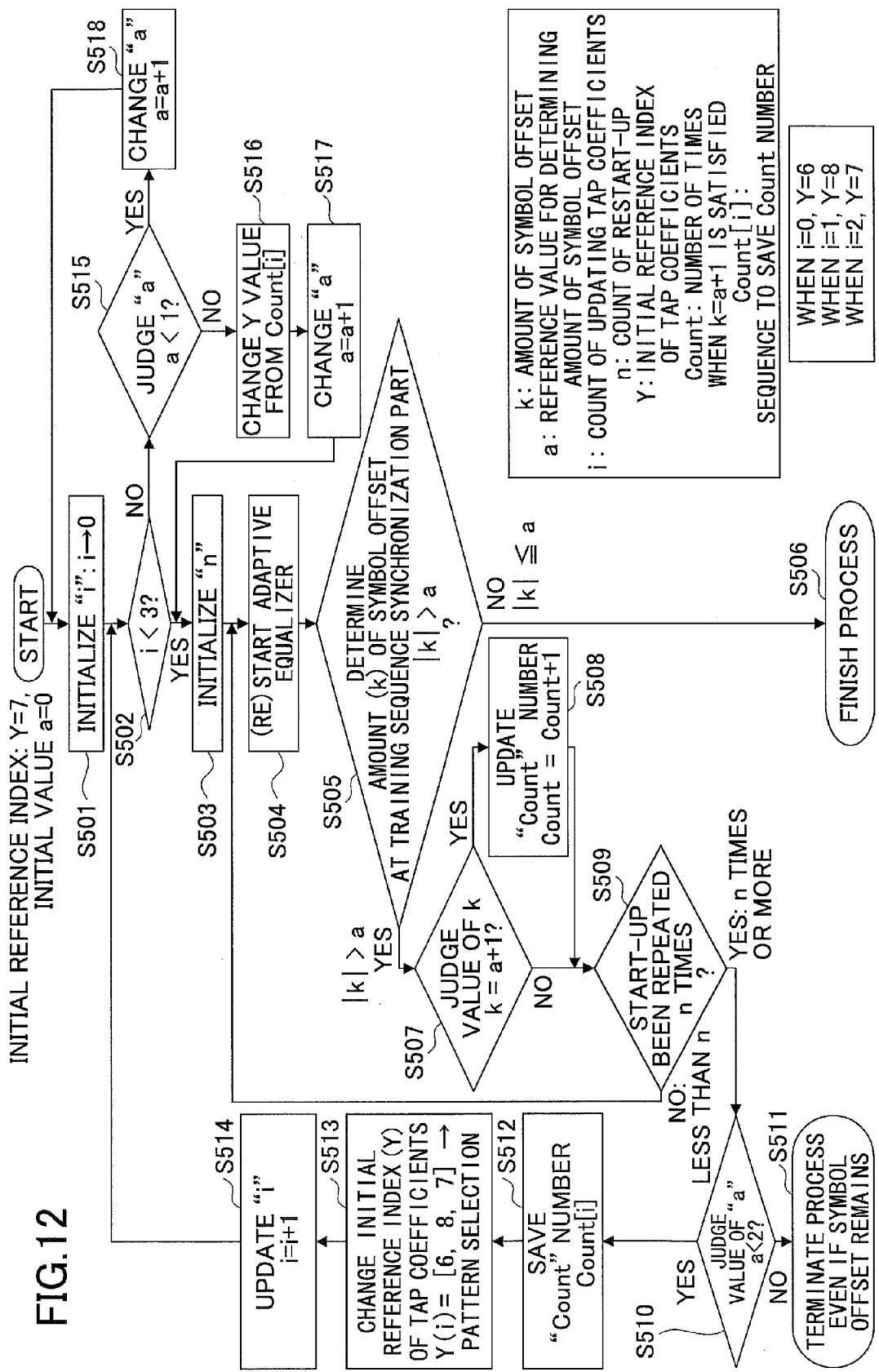
FIG. 12 is a flowchart of optimization of an adaptive equalizer through restart-up operations according to the third embodiment.

FIG. 12 illustrates still another modification of the optimization of the adaptive equalizer 13. The methods of FIG. 10 and FIG. 11 may not always correct symbol offset even if the reference value "a" is adjusted. The process of FIG. 12 makes use of a counter value to select a tap index with which a predetermined value "a+1" is most likely to come up as the initial reference index.

First, the initial reference index Y for the tap coefficients is set to 7 (Y=7), the reference value "a" for symbol offset determination is set to zero (a=0), and "i" representing the number of changes of Y value is initialized (S501). It is determined whether "i" resides in a prescribed range (S502). Because in this example the initial reference index Y is changed among 6, 7 and 8, it is determined whether "i" is less than 3 (i<3). If i<3 is satisfied, "n" representing the number of restart-up times is initialized (S503) and the adaptive equalizer 13 is started (S504).

Upon the startup, the amount "k" of symbol offset is determined based upon the signal from the training sequence synchronization part 21 (S505). If the symbol offset is at or below the reference value "a" (|k|≤a), the process terminates (S506).

If the symbol offset is greater than the reference value "a" (|k|>a), then it is determined whether the amount of symbol offset is a+1 (k=a+1), that means, if k=1 is satisfied (S507). If the symbol offset amount "k" is not a+1 (k≠a+1), it is determined whether the startup instruction has been repeated n times (S509). If the symbol offset amount "k" is a+1 (which means k=1), the counter adapted to count the k=1 case is incremented (S508) and then determination is made whether the startup operation has been repeated n times (S509).

The startup instruction for the adaptive equalizer 13 and determination of symbol offset are repeated until the startup operation is repeated n times. If symbol offset does not converge at or below the reference value "a" in spite of the n repetitions of the startup operations (YES S509), the reference value "a" is adjusted (S510). If the reference value "a" is at or above 2, the process terminates even if symbol offset remains (S511). If the reference value "a" is less than 2 (a<2), the counter value counting the k=1 cases is stored together with the associated Y value (S512). Then, the initial reference index Y for the tap coefficients is changed (S513). The Y-value changing count "i" is incremented (S514) and the process returns to S502.

If the "i" value becomes 3 or more, which means that the symbol offset greater than the reference value "a" still remains after the initial reference index Y has been changed among 6, 7 and 8, then the reference value "a" is adjusted (S515). If "a" is less than 1, the "a" value is changed to "a+1" (S518), and the process returns to S501. If "a" is equal to or greater than 1, an initial reference index Y that has the greatest counts of symbol offset k equal to a+1 (i.e., k=1) is selected from the counter values stored during the latest n startup operations (S516). Then, the "a" value is changed to a+1 (S517), and step S503 and the subsequent steps are repeated. If there are two or more Y values that have the greatest count values, a value closest to the tap center is selected as the initial reference index Y (S516).

With this arrangement, if symbol offset is not reduced to a prescribed level after the switching of the Y value within a predetermined range, a tap index that is most likely to lead to the symbol offset amount "k" equal to a+1 (namely, k=1) is selected as the initial reference index Y. Accordingly, the adaptive equalizer 13 is optimized by minimizing the symbol offset as much as possible.

FIG. 13 illustrates a modification of the process of FIG. 12. In FIG. 13, determination of symbol offset is made for all the tap indexes, without limiting the Y value changing range. First, it is determined whether "i" is less than 13 (i<13) (S602). If the symbol offset does not converge at or below "a" even after a predetermined number of startup operations, the Y value is incremented from 1 to 2, 3, . . . , 13 (S613). The rest of the process is the same as that in FIG. 12, and therefore, redundant explanation will be omitted.

Figure 14B:
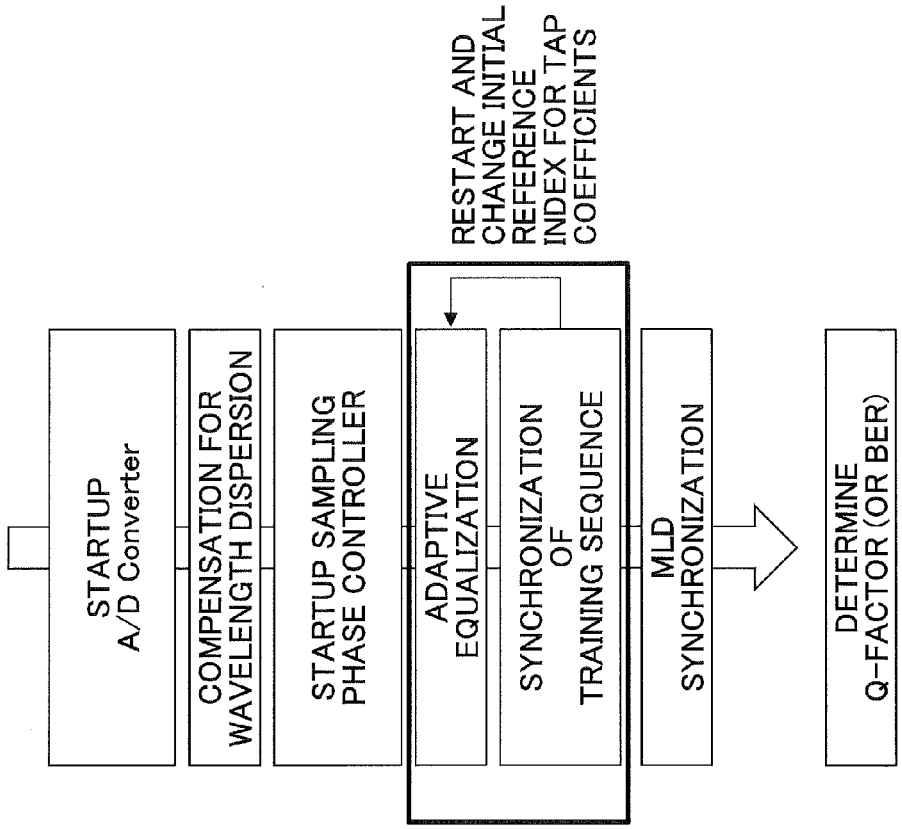
FIG. 14B illustrates an advantageous effect of the optimization of the adaptive equalizer according to the embodiment.
Figure 14A:
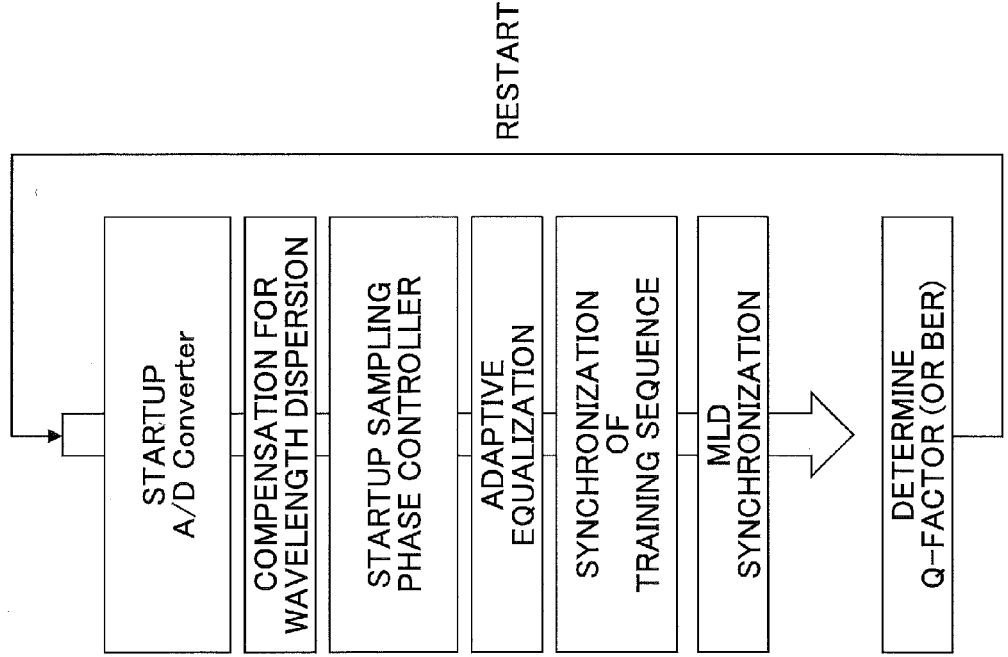
FIG. 14A illustrates a possible method of optimization of an adaptive equalizer.

FIG. 14A illustrates one possible arrangement for the optimization of the adaptive equalizer. FIG. B illustrates the advantageous effects of the embodiment compared to FIG. 14A. In FIG. 14A, necessity for restart-up of the adaptive equalizer is determined based upon the bit error rate (BER). The state of convergence of the adaptive equalizer is determined after synchronization of training sequence, multilane distribution (MLD) synchronization, and decoding of error-correcting code for BER determination have been carried out. If the BER determination result is unsatisfactory, A/D converters are restarted and the entire process, including compensation for wavelength dispersion and sampling phase control (synchronization), is repeated until the BER becomes satisfactory level.

In contrast, the process of FIG. 14B determines necessity for restart-up of the adaptive equalizer from the synchronization result of the training sequence immediately after the adaptive equalization performed after the startup of the A/D converters, compensation for wavelength dispersion and sampling phase control (synchronization). In addition, the initial reference tap index for the tap coefficients is changed depending on the situation after the restart-up. Consequently, the overall system startup time is reduced.

The basic flow of FIG. 4 can be combined with an arbitrary part of FIG. 8 through FIG. 13. For example, in FIG. 10 and FIG. 11, the reference value "a" used for determination of the symbol offset amount is increased if symbol offset is not eliminated even after the initial reference index Y for the tap coefficients of the adaptive equalizer 13 has been changed. This arrangement may be applied to FIG. 4. In this case, if the symbol offset does not become zero after N repetitions of restart operation of the adaptive equalizer 13, the process of FIG. 4 may be repeated by setting the reference value "a" for symbol offset determination to 1. In place of changing the reference index Y from the smallest tap index to the greater index, the determination may be made starting from the tap center (for example, tap 7), changing the reference index Y in alternate directions toward the edges (tap 1 and tap 13) of the tap sequence.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical receiver comprising:
a receiving frontend to receive an optical signal and output an electric signal;
a converter to convert the electric signal to a digital signal;
an adaptive equalizer to adaptively equalize the digital signal;
a synchronization part to synchronize a first polarized wave and a second polarized wave contained in the adaptively equalized digital signal with each other, polarization axes of the first polarized wave and the second polarized wave being perpendicular to each other; and
a symbol offset determination part to determine an amount of symbol offset between the first polarized wave and the second polarized wave based upon symbol synchronization information of the first polarized wave and the second polarized wave supplied from the synchronization part, the symbol offset determination part being configured to repeat determination of the amount of the symbol offset and output a restart-up instruction to the adaptive equalizer until the symbol offset is minimized,
wherein the symbol offset determination part changes an initial reference index for tap coefficients of the adaptive equalizer if the symbol offset does not become a first value or less after the restart-up instruction has been repeated a prescribed number of times,
wherein if the determined symbol offset does not become the first value or less, then the symbol offset determination part determines whether the determined symbol offset is equal to a second value that is greater than the first value and counts an event of the second value if the determined symbol offset is equal to the second value,
wherein when the initial reference index for the tap coefficients of the adaptive equalizer is changed, the symbol offset determination part stores a previous initial reference index together with a count value of the event of the second value, and
wherein if the symbol offset does not become the first value or less even after the initial reference index for the tap coefficients has been changed within a prescribed range, the symbol offset determination part selects an index value that has a maximum count value of the event of the second value as the initial reference index.

2. The optical receiver as claimed in claim 1, wherein the symbol offset determination part changes the first value to a second value greater than the first value if the symbol offset does not become the first value or less after the restart-up instruction has been repeated the prescribed number of times.

3. The optical receiver as claimed in claim 1, wherein if the symbol offset does not become a first value or less after the restart-up instruction has been repeated a prescribed number of times, the symbol offset determination part changes the first value to a second value that is greater than the first value.

4. The optical receiver as claimed in claim 1, wherein the symbol offset determination part changes the initial reference index for the tap coefficients of the adaptive equalizer within a predetermined range including a tap index of a center tap of the adaptive equalizer.

5. The optical receiver as claimed in claim 4, wherein the symbol offset determination part changes the initial reference index starting from the tap index of the center tap and alternately changing the tap index toward both ends of said predetermined range.

6. The optical receiver as claimed in claim 1, wherein the symbol offset determination part changes the initial reference index in a range of all tap indexes of a tap sequence of the adaptive equalizer.

7. The optical receiver as claimed in claim 6, wherein the symbol offset determination part changes the initial reference index starting from the tap index of the center tap and alternately changing the tap index toward both ends of the tap sequence of the adaptive equalizer.

8. A signal processing method for an optical receiver, comprising:
converting an optical signal received by the optical receiver to an electric signal;
converting the electric signal to a digital signal;
adaptively equalizing the digital signal using an adaptive equalizer;
synchronizing a first polarized wave and a second polarized wave contained in the adaptively equalized digital signal with each other, polarization axes of the first polarized wave and the second polarized wave being perpendicular to each other;
determining an amount of symbol offset between the first polarized wave and the second polarized wave based upon symbol synchronization information of the first polarized wave and the second polarized wave acquired from a synchronization result;
repeating determination of the amount of the symbol offset and restarting the adaptive equalizer until the symbol offset is minimized;
changing an initial reference index for tap coefficients of the adaptive equalizer if the symbol offset does not become a first value or less after the adaptive equalizer has been restarted a prescribed number of times;
determining, if the determined symbol offset does not become the first value or less, whether the determined symbol offset is equal to a second value that is greater than the first value;
counting an event of the second value if the determined symbol offset is equal to the second value, storing a previous initial reference index together with a count value of the event of the second value when the initial reference index for the tap coefficients of the adaptive equalizer is changed, and
selecting, if the symbol offset does not become the first value or less even after the initial reference index for the tap coefficients has been changed within a prescribed range, an index value that has a maximum count value of the event of the second value as the initial reference index.

9. The signal processing method as claimed in claim 8, further comprising:
changing the first value to a second value greater than the first value if the symbol offset does not become the first value or less after the adaptive equalizer has been restarted the prescribed number of times.

10. The signal processing method as claimed in claim 8, further comprising:
changing, if the symbol offset does not become a first value or less after the adaptive equalizer has been restarted a prescribed number of times, the first value to a second value that is greater than the first value.

11. The signal processing method as claimed in claim 8, wherein the initial reference index for the tap coefficients of the adaptive equalizer is changed within a predetermined range including a tap index of a center tap of the adaptive equalizer.

12. The signal processing method as claimed in claim 11, wherein the initial reference index is changed starting from the tap index of the center tap and alternately changed toward both ends of said predetermined range.

13. The signal processing method as claimed in claim 8, wherein the initial reference index is changed in a range of all tap indexes of a tap sequence of the adaptive equalizer.

14. The signal processing method as claimed in claim 13, wherein the initial reference index is changed starting from the tap index of the center tap and alternately changed toward both ends of the tap sequence of the adaptive equalizer.

\* \* \* \* \*